United States Patent
Osswald

(10) Patent No.: US 7,936,680 B2
(45) Date of Patent: May 3, 2011

(54) METHOD AND APPARATUS FOR INCREASING THE SCALABILITY OF ETHERNET OAM

(75) Inventor: John Osswald, Northbridge, MA (US)

(73) Assignee: Nortel Networks Limited, Mississauga, Ontario (CA)

( * ) Notice: Subject to any disclaimer, the term of this patent is extended or adjusted under 35 U.S.C. 154(b) by 1456 days.

(21) Appl. No.: 11/297,822

(22) Filed: Dec. 8, 2005

(65) Prior Publication Data

US 2007/0133502 A1 Jun. 14, 2007

(51) Int. Cl.
*G01R 31/08* (2006.01)
*H04J 1/16* (2006.01)

(52) U.S. Cl. ............ 370/236; 370/241.1; 370/395.53; 370/419; 709/201

(58) Field of Classification Search .......... 370/236, 370/351, 216, 225, 227, 228, 229, 236.2, 370/241.1, 395.53, 419; 709/201
See application file for complete search history.

(56) References Cited

U.S. PATENT DOCUMENTS

| | | | | |
|---|---|---|---|---|
| 5,715,237 A | * | 2/1998 | Akiyoshi | 370/228 |
| 5,778,003 A | * | 7/1998 | Puppa et al. | 714/716 |
| 6,137,875 A | * | 10/2000 | Mo | 379/241 |
| 2004/0039772 A1 | * | 2/2004 | De Miguel et al. | 709/201 |
| 2004/0246981 A1 | * | 12/2004 | He et al. | 370/419 |
| 2006/0007867 A1 | * | 1/2006 | Elie-Dit-Cosaque et al. | 370/241.1 |
| 2006/0245436 A1 | * | 11/2006 | Sajassi | 370/395.53 |

* cited by examiner

*Primary Examiner* — Aung S Moe
*Assistant Examiner* — Jamal Javaid
(74) *Attorney, Agent, or Firm* — Christopher & Weisberg, P.A.

(57) ABSTRACT

After statically provisioned paths are created through an Ethernet network, trunks may be created to extend along those paths. The trunks extend between pairs of NNI interfaces on either end of the path, and Ethernet OAM may be run over the trunks to detect connectivity along the paths. Service instances and service groups may be provisioned over particular paths through the network. Each service instance/service group is associated with a trunk and the Ethernet OAM service on the trunk may be used to provide Ethernet connectivity OAM for the service instance/service group. Upon detection of a failure on the trunk, the service instances/service groups associated with the trunk may be caused to failover to an alternate path through the network. Thus, a single Ethernet OAM service instance may be used to provide connectivity verification so that connectivity detection does not need to be performed on each individual service instances/service group.

5 Claims, 6 Drawing Sheets

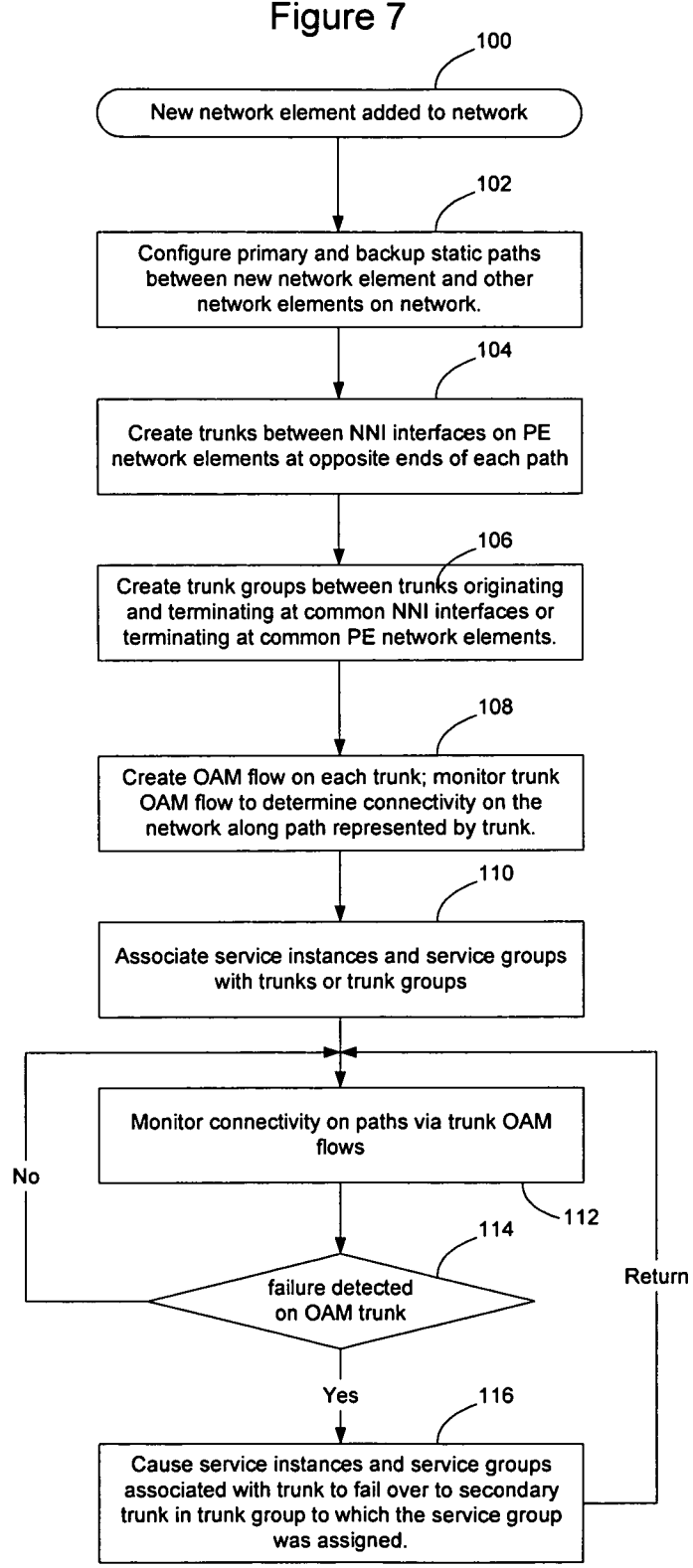

METHOD AND APPARATUS FOR INCREASING THE SCALABILITY OF ETHERNET OAM

BACKGROUND OF THE INVENTION

1. Field of the Invention

The present invention relates to communication networks and, more particularly, to a method and apparatus for increasing the scalability of Ethernet Operation Administration and Maintenance (OAM).

2. Description of the Related Art

Data communication networks may include various routers, switches, bridges, hubs, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Ethernet is a well known networking protocol that has been defined by the Institute of Electrical and Electronics Engineers (IEEE) as standard 802. Ethernet was developed to be used to implement local area networks in enterprises such as businesses and campuses. Since it wasn't originally developed as a long haul transport technology, other technologies were initially used to transport data between Ethernet networks. For example, when two Ethernet networks were to be connected over a service provider's network, the Ethernet frames would be converted to protocol data units formed according to a transport protocol in use on the service provider's network, and then carried over the network. The Ethernet frames would then be recovered at the other side of the service provider's network and passed onto the second Ethernet network.

As the underlying networks have evolved and larger numbers of Ethernet networks are being connected together, it has become more desirable to use Ethernet as a transport technology on service provider networks. Additionally, as Ethernet has increased in popularity, the price for Ethernet ports has dropped, thus potentially making Ethernet a cost-effective alternative to traditional transport technologies.

A portion of an example communication network 10 is shown in FIG. 1. In the example network 10 of FIG. 1, each customer site 11 is connected to the network 10 using one or more Customer Edge (CE) network elements 12. The CE network elements 12 are connected to Provider Edge (PE) network elements 14, which in turn are connected to Provider (P) network elements 16. Network elements within the service provider's network that interface CE network elements will be referred to herein as Provider Edge (PE) network elements 14, whereas network elements within the service provider's network that only interface other service provider network elements and do not interface CE network elements will be referred to as Provider (P) network elements 16. CE-PE links 18, PE-P links 20, and P-P links 22 are formed on the network to enable data to be transported across the communication network.

When Ethernet is to be used on a service provider network, paths through the network are statically provisioned between pairs of PE network elements, and data traffic between these PE network elements will then follow the established paths through the network. As shown in FIG. 2, generally, multiple paths 30 may be statically provisioned through the network so that traffic between the PEs may traverse the network.

FIG. 3 shows an example of a path through a network such as the network of FIG. 1. As shown in FIG. 3, each network element along the path has one or more interfaces that allow it to connect to links 18, 20, 22, along the path. One type of port that may be used to interface a CE-PE links 18 on a PE network element is a User to Network Interface (UNI). For example, as shown in FIG. 3, the CE network element 12 includes an uplink interface 24 connected to link 18, and the PE network element 14 includes a UNI interface 26 connected to link 18. These interfaces enable messages to be passed between the CE and PE network elements over link 18 and otherwise allow the network elements to coordinate the exchange of data over link 18.

Within the network, links are interfaced using ports configured as Network to Network Interfaces (NNI). Thus, for example, PE network element 14 includes an NNI interface 28 configured to interface link PE-P link 20, and the P network element 16 includes several NNI interfaces configured to connect to PE-P links 20 and P-P links 22.

Data that is to be transmitted between end users will form flows of data on the network. The portion of the flow of data that extends between the UNI interfaces on the network will be referred to herein as a service instance. For example, FIG. 4 illustrates a particular flow of data 32 between a first computer 34 on a local area network 36 connected to a first CE network element (CE1), and a second computer 28 on a second local area network 40 connected to a second CE network element (CE2). The flow of data, in this example, extends between two computers which may be servers, personal computers, tablet computers, or other types of electronic devices capable of exchanging data over a network. The data flow may be associated with a virtual private network or another logical flow of data between the two devices. At the network level, the flow of data will be carried on a service instance extending between a pair of the UNIs 26 on PE network elements.

Multiple service instances may be provisioned through a particular UNI interface on a PE network element. Service instances through a common pair of UNIs on a pair of PEs on the network 10 may be logically grouped to form a service group.

If Ethernet is to be used in a service provider's network, it is necessary to implement Operation, Administration, and Maintenance (OAM) functions in Ethernet so that service providers can monitor service availability on the network. OAM functions generally include transmission of ping, trace route, and keep-alive messages, although other messages may be supported as well. Transmission of OAM messages allows the service provider to monitor configuration as well as connectivity on the network.

Conventionally, Ethernet OAM has been run at the service instance or service group level to verify connectivity. Since there may be hundreds of service groups, and each of the service groups may include hundreds or more service instances, running Ethernet OAM at the service instance or service group level may consume a considerable amount of bandwidth on the network. For example, if each service instance or service group transmits OAM messages sufficiently regularly to guarantee fault detection and restoration within 50 ms of fault occurrence, it may be necessary to allocate a significant portion of the available bandwidth to implementing OAM on the network. As the network increases in size, the number of Ethernet OAM messages that must be carried may increase to the point where scalability of the Ethernet network is impeded. Thus, it would be advantageous to provide a method and apparatus for increasing the scalability of Ethernet OAM.

SUMMARY OF THE INVENTION

Scalability of an Ethernet network may be increased by creating trunks on the network to follow statically provisioned paths through the network, and running OAM at the trunk level. The trunks do not carry data, but rather extend along the same path as the service groups/service instances between a pair of PE network elements and only carry OAM messages. In one embodiment, the trunks extend between NNI interfaces of the PE network elements. When a failure is detected on the OAM trunk, the service groups and, hence, the service instances configured to use the same path on the network as the trunk may be automatically switched to an alternate path through the network. Thus, a single OAM instance on the OAM trunk may be used to detect connectivity along a path through the network and, upon detection of a failure on the trunk, the service groups and service instances along that path may be switched to an alternative path through the network. For convenience, two or more paths through the network may be configured, trunks may be configured along the two or more paths, and the trunks may be logically grouped into a trunk group. Upon detection of a failure on one trunk in the trunk group, service instances and service groups may be protection switched to an alternate path associated with their trunk group.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 7 is a flow chart illustrating a process of using Ethernet OAM at the trunk level to perform network OAM for a plurality of service groups and service instances simultaneously.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 5:
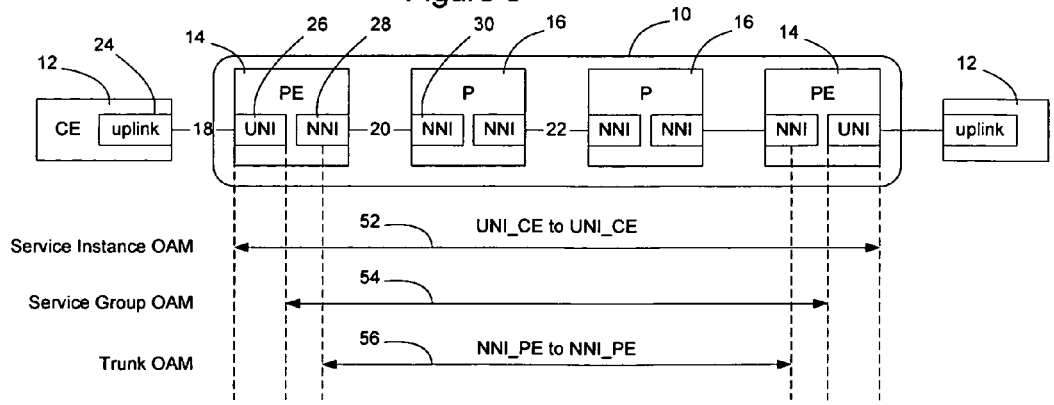
FIG. 5 is a functional block diagram of path through the network and illustrating possible OAM flows that may be used to monitor different aspects of communication through the network according to an embodiment of the invention.

FIG. 5 illustrates several possible OAM flows that may occur on the network 10. As shown in FIG. 5, a service instance OAM flow 52 may be created between UNIs on the CEs forming the network termination points of the service instance. This allows OAM to be used to monitor particular service instances on the network. As discussed above, due to the large number of service instances, verification of connectivity at the service instance level may be difficult due to scalability issues. However, OAM may still be used at the service instance level to verify configuration information since configuration OAM may be performed much less frequently than is required to implement connectivity OAM. Specifically, since configuration doesn't change as rapidly and doesn't need to be detected in real time, configuration OAM packets may be transmitted every few minutes. To detect and remedy network failures in less than 50 ms in a connectivity context, by contrast, requires OAM messages to be transmitted much more frequently.

OAM flows 54 may also be run on the service groups, which carry multiple service instances between UNI ports 26 on pairs of PE network elements. The service group OAM flows may be used by the network administrator to monitor configuration of a particular service group. However, due to the large number of service groups on the network, running connectivity OAM at the service group level may impede scalability of the Ethernet network, albeit less than when connectivity OAM is run at the service instance level.

According to an embodiment of the invention, trunks are established between pairs of NNI interfaces on a network to follow the statically provisioned paths through the Ethernet network. Trunk OAM flows 56 are created to be run on the trunks to verify connectivity along the static paths through the Ethernet network. Connectivity for those service groups that follow the static path associated with the trunk is provided by the trunk OAM. When the trunk OAM flow indicates that the trunk is down, it may be inferred that there is a problem on the path through the network, and all service groups and service instances associated with the trunk may be protection switched to one or more alternate trunks. In this manner, a single trunk OAM flow may be used to provide connectivity OAM for a large number of service instances and service groups.

A trunk extends from a NNI interface on one PE network element to a NNI interface on another PE network element. Since the trunk extends between NNI interfaces on PE network elements, it may be used to provide OAM connectivity on behalf of multiple service groups which may carry service instances for different VPNs without compromising the security afforded by those VPNs. Each service group that follows a particular path will be associated with a trunk, and those service groups that have a common secondary trunk will belong to a common trunk group. A trunk group is a convenient way of designating primary and secondary trunks so that upon failure of a primary trunk the service groups associated with the trunk group may automatically be switched over to the secondary trunk. A given primary trunk may belong to multiple trunk groups so that, upon detection of a failure on the trunk, all service groups associated with the trunk will failover to other trunks depending on their particular trunk group assignment. Although in this example the trunk group has been described as having two trunks, the trunk groups are not limited in this manner as more than two trunks may be included in a trunk group as well.

Figure 6A:
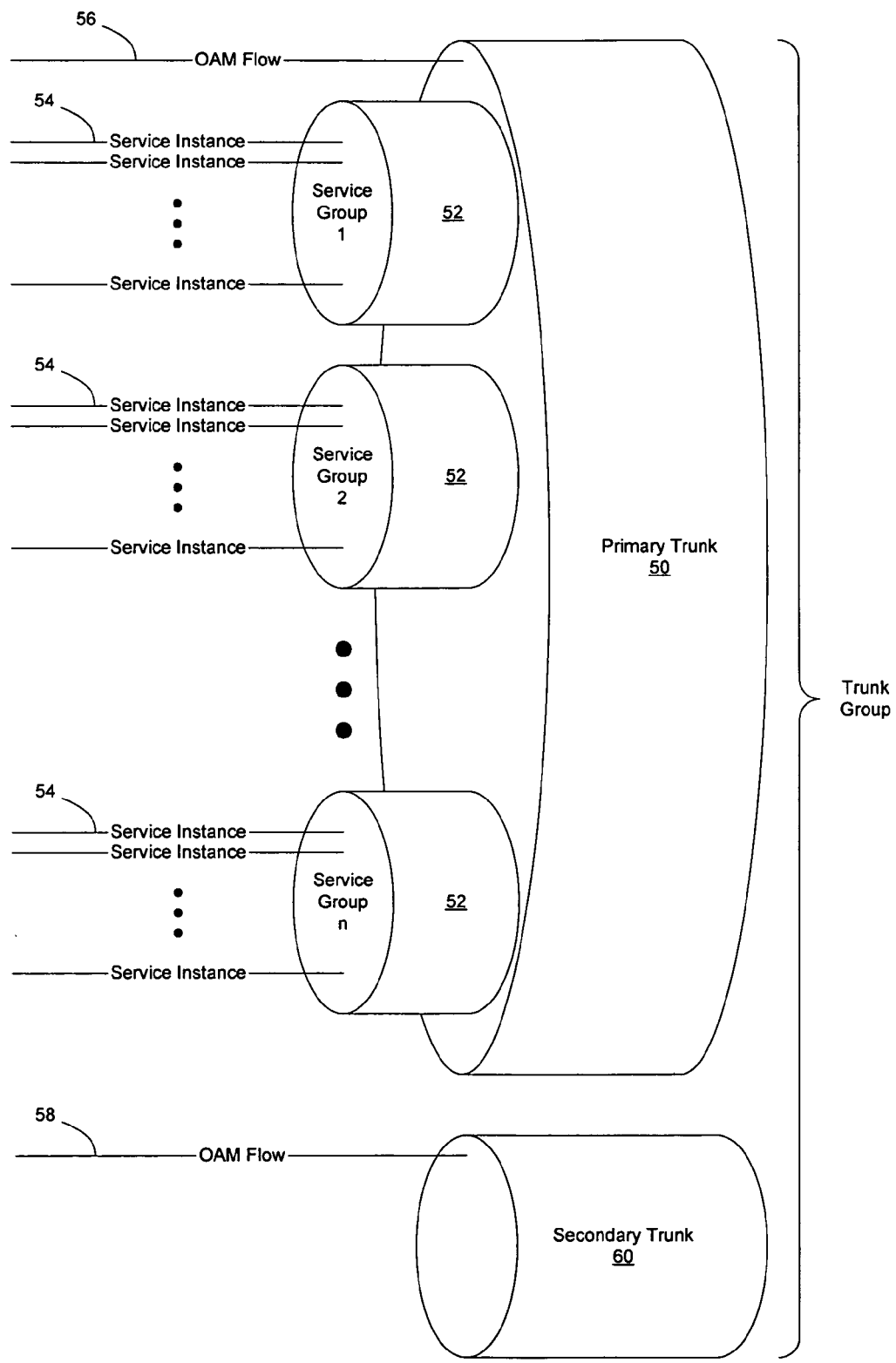
FIGS. 6A and 6B are representative diagrams illustrating trunk groups, trunks, service groups, service instances, and trunk OAM flows, according to an embodiment of the invention.
Figure 6B:
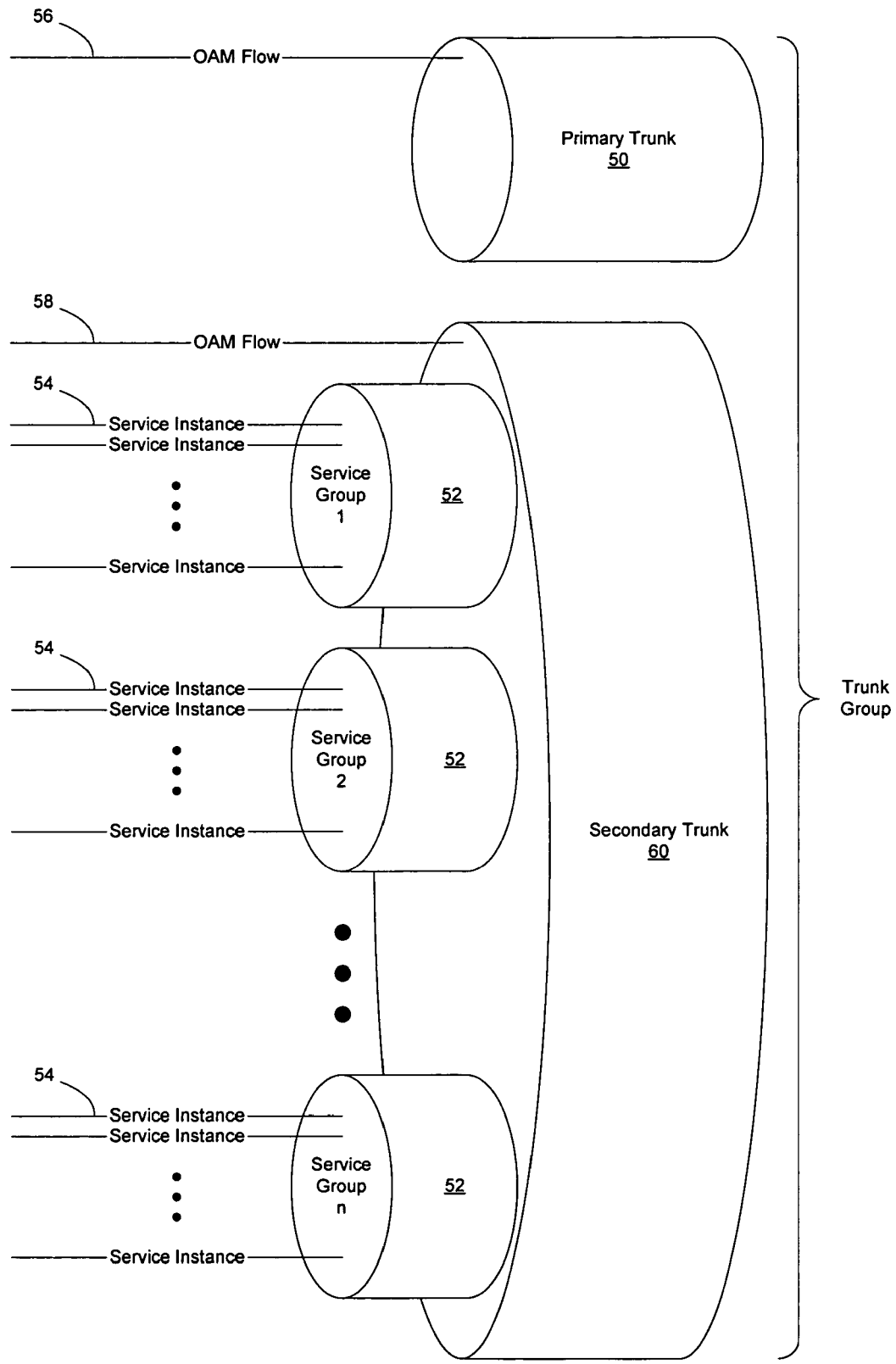

FIG. 6A shows an example trunk group including a primary trunk 58 and a secondary trunk 60, which may be set up between a pair of NNI ports on PE network elements 14 on the network 10. As shown in FIG. 6A, the primary trunk 58 initially includes service groups 1-n (62), each of which includes one or more service instances 32. A trunk OAM flow 56 is created for the primary trunk 58 to enable connectivity of the primary trunk 58 to be monitored. Similarly, a second trunk OAM flow 56' is created for secondary trunk 60 to allow connectivity of the secondary trunk to be monitored. Upon detection of a lack of connectivity on the primary trunk 58, as shown in FIG. 6B, the service groups and associated service instances are transferred from the primary trunk 50 to a secondary trunk 60 in their respective trunk group to effect a fast failover of traffic from a first trunk to one or more second trunks on the network. In the illustrated example it was assumed that all of the service groups belonged to the same trunk group and, accordingly, would be transferred to the same secondary trunk 60 upon detection of a connectivity failure on the primary trunk 58. The invention is not limited in this manner since the service groups may failover to different secondary trunks depending on the particular way in which the service groups were assigned to trunk groups.

The single OAM flow 56 is thus able to provide connectivity OAM services for all of the service instances and service groups on a particular path on the network. Accordingly, connectivity does not need to be verified in each individual service instance and/or service group. This allows fewer OAM packets to be used to verify connectivity at the network layer to thereby increase the scalability of the Ethernet network.

FIG. 7 shows a flow chart of a process that may be used to increase the scalability of Ethernet OAM. As shown in FIG. 7, when the network is first started or more likely when a network element is started on the network (100), paths between the network elements on the network will need to be statically provisioned. For example, when a network element is added to the network, such as when a network element is restarted and needs to reestablish connections with the other network elements, primary and backup paths will be provisioned between the new PE network element and the other PE network elements on the network (102).

To enable the paths to be monitored, trunks will be created between NNI interfaces on the PE network elements at opposite ends of the path (104). Each trunk will be configured to follow a particular statically provisioned path through the network so that connectivity on the paths may be monitored via OAM flows on the trunks. By configuring the trunks from NNI to NNI, it is possible to use a single OAM instance to monitor the path.

Once trunks are configured, trunk groups may be created (106). The trunk groups are logical associations of trunks originating and terminating at common NNI interfaces or terminating at NNI interfaces on common PE network elements. The trunks in the trunk groups may be designated as primary and secondary trunks. Service groups may be assigned to the trunk groups so that, upon failure of the primary trunk in a trunk group, all service groups associated with the trunk group may be automatically caused to failover to the secondary trunk in the trunk group.

OAM flows are then created on each trunk so that connectivity on the trunks may be monitored. In operation, the OAM instances on the trunks will be monitored to determine if connectivity on the path through the network has been affected by a failure on the network (108).

Service instances and service groups will then be associated with particular trunks or trunk groups (110) and connectivity on the paths taken by these service instances and service groups will be verified by monitoring connectivity via the trunk OAM flows 56 (112). If a fault is detected on the OAM trunk (114), the service groups associated with the trunk are caused to fail over to their respective secondary trunks depending on the trunk group to which they have been assigned (116). All service groups may be assigned to the same trunk group or different service groups may be assigned to different trunk groups where more than two paths exist between a given pair of PE network elements.

Trunks may be established by a network administrator or may be established automatically through the appropriate exchange of messages according to well defined routing and signaling protocols. The invention is not limited by the particular way in which the trunks are set up on the network.

Figure 8:
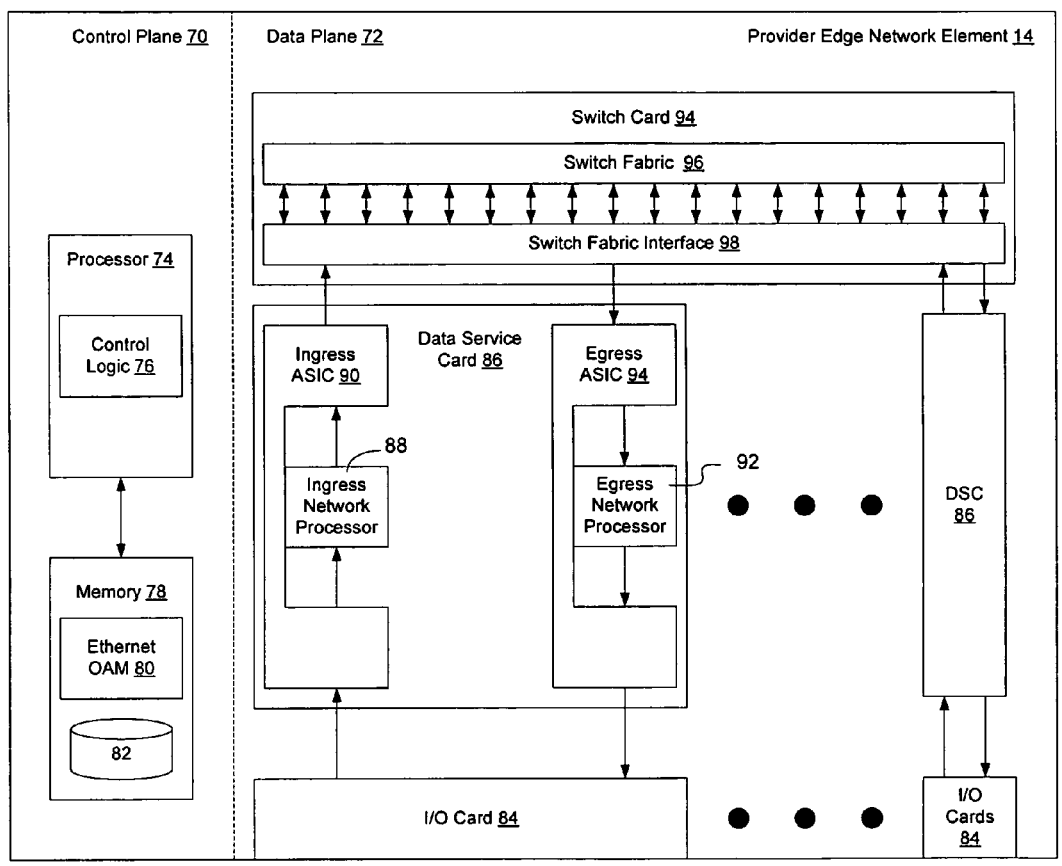
FIG. 8 is a functional block diagram of a network element that may be used to perform trunk level Ethernet OAM according to an embodiment of the invention.

FIG. 8 illustrates one embodiment of a PE network element that may be configured to implement an embodiment of the invention. The invention is not limited to a network element configured as illustrated, however, as the invention may be implemented on a network element configured in many different ways. The discussion of the specific structure and methods of operation of the embodiment illustrated in FIG. 8 is intended only to provide one example of how the invention may be used and implemented in a particular instance. The invention more broadly may be used in connection with any network element configured to handle Ethernet frames in a communications network.

Figure 1:
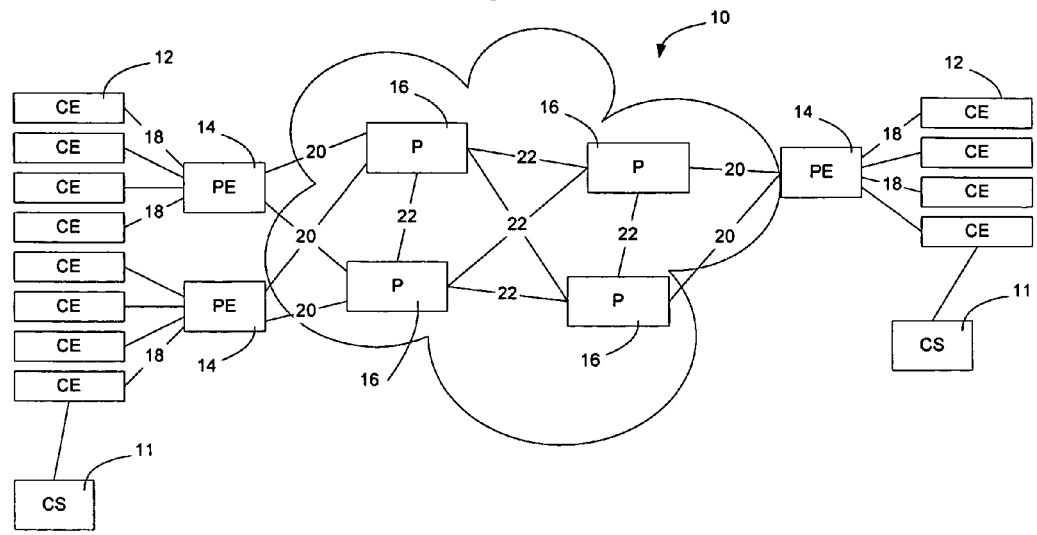
FIG. 1 is a functional block diagram of an example communication network.
Figure 2:
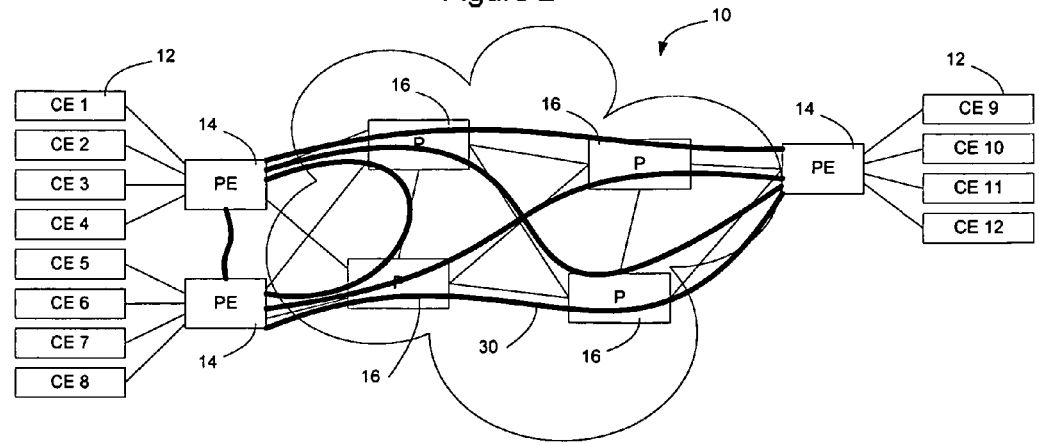
FIG. 2 is a functional block diagram illustrating paths through the PE network elements in the example network of FIG. 1.
Figure 3:
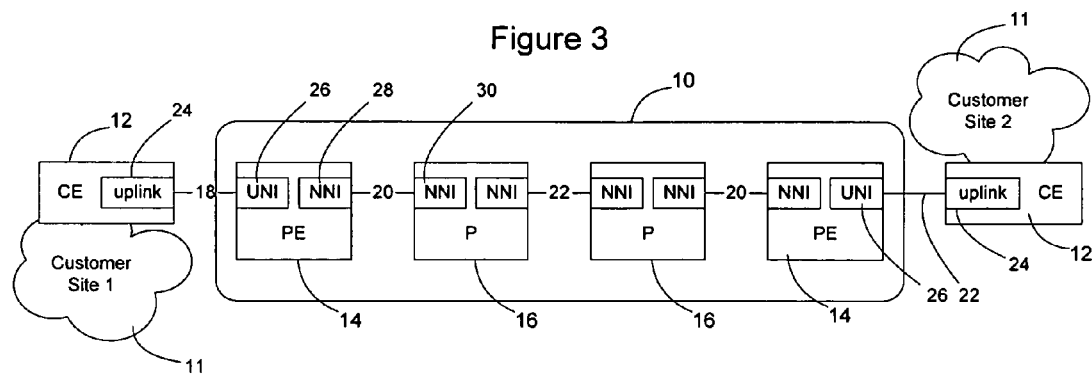
FIG. 3 is a functional block diagram of one of the paths of FIG. 2 in greater detail.
Figure 4:
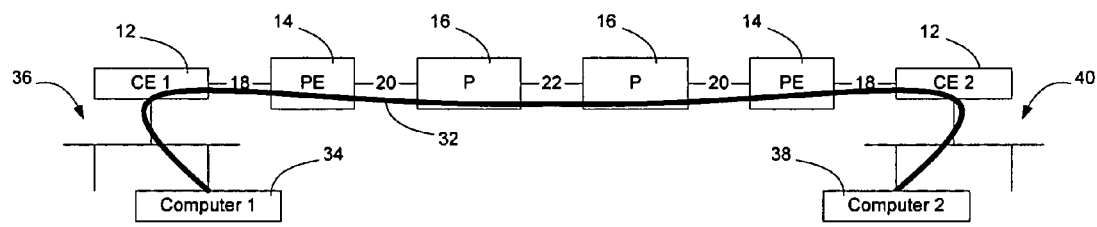
FIG. 4 is a functional block diagram illustrating a service instance to be carried on the path of FIG. 3.

As shown in FIG. 2, the PE network element 14 generally includes a control plane 70 and a data plane 72. The control plane, in this embodiment, is configured to perform control functions such as to interface with other network elements to perform protocol exchanges with other network elements on the network. The control plane is also configured to pass configuration information to the data plane to control how the data plane forwards packets on the network. In the illustrated embodiment the control plane 70 includes a control processor 74 configured to implement control logic 76 that may be programmed using standard software techniques to enable the PE network element to implement the Ethernet OAM functions described herein. For example, a memory 78 may be provided containing data and instructions 80 to be executed on processor 74 to enable the PE network element to establish trunks on the network, run Ethernet OAM flows on the trunks.

The memory also implements a database 82 containing correlation information that will enable the particular trunk OAM flows to be correlated with service groups and/or service instances so that, upon detection of a failure on a trunk, the correlated service groups and/or service instances may be caused to failover to alternate paths. The database may be implemented as a table structure or may be implemented using other conventional data structures and the invention is not limited to the particular manner in which the database is structured.

The data plane 72 of the network element 15 may be configured to handle packets of data on the network. In the illustrated embodiment, the data plane includes Input/Output (I/O) cards 84 configured to connect to links in the communications network. The I/O cards 22 may include physical interfaces, such as optical ports, electrical ports, wireless ports, infrared ports, or ports configured to communicate with other conventional physical media, as well as configurable logical elements. The I/O cards may be configured to implement the NNI and UNI interfaces described above.

The data plane 72 also includes one or more data service cards 86 configured to process packets received over the I/O cards 84. In the illustrated example, the data service cards 86 include an ingress network processor 88 supported by ingress ASIC 90, and an egress network processor 92 supported by an egress ASIC 94. The processors and ASICs enable the control plane to control operation of the data plane to enable different functions to be performed on packets on the network. For example, in connection with the present invention, the ingress and/or egress network processors may be used to process OAM packets and detect an OAM failure on the network. Alternatively, one of the ASICs and/or processors may cause the OAM packets to be forwarded to the control plane to enable the control plane to perform the OAM functions on behalf of the network element. The invention is not limited to a particular manner in which trunk OAM flows are generated and interpreted, as many different architectures may be used to implement these functions.

A switch card 94 containing a switch fabric interface 96 and switch fabric 98 may be provided to enable frames to be switched between different data service cards. Although a particular data plane architecture has been illustrated, the invention is not limited to any particular architecture as the invention may be implemented on a network element formed using many different types of network elements.

The aspects of Ethernet OAM may be implemented in a number of different manners, including as software centrally instantiated in one or more management systems or as distributed code instantiated in the various network elements configured to implement the OAM functions. It should be understood that all functional statements made herein describing the functions to be performed by the methods of the invention may be performed by software programs implemented utilizing subroutines and other programming techniques known to those of ordinary skill in the art. Alternatively, the aspects of Ethernet OAM may be implemented in hardware, firmware, or a combination of hardware, software, and firmware. The invention is thus not limited to a particular implementation.

When the OAM functions are implemented in software, the software may be implemented as a set of program instructions configured to operate in control logic on a network element that are stored in a computer readable memory within the network element and executed on a microprocessor. For example, in the network element of FIG. 2, the OAM functions may be performed by OAM module 46 implemented as software and executed on a processor associated with the interface manager 40. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of increasing scalability of Ethernet OAM on an Ethernet network, the method comprising the steps of:
   defining a first path through the Ethernet network between a first Provider Edge (PE) network element and a second PE network element, each of said PE network elements having a plurality of User to Network Interfaces (UNIs) configured to connect to links associated with Customer Edge (CE) network elements and a plurality of Network to Network Interfaces (NNIs) configured to connect to links associated with Provider (P) network elements;
   defining a first trunk to follow the first path through the Ethernet network and extending between a first NNI interface on a first of the PE network elements and a second NNI interface on a second of the PE network elements;
   mapping service instances extending between a plurality of UNIs on the first of the PE network elements to a plurality of UNIs on the second of the PE network elements to the first trunk;
   grouping service instances that extend between pairs of UNIs into service groups, each of the pairs of UNIs being defined as including a particular UNI on the first PE network element and a particular UNI on the second PE network element;
   running an Ethernet trunk OAM flow on the first trunk to determine connectivity on the path through the network; and
   associating the Ethernet trunk OAM flow with the service instances and service groups so that the trunk OAM flow may provide connectivity OAM for the service instances and service groups mapped to the first trunk.

2. The method of claim 1, further comprising the step of:
   defining a second path through the Ethernet network between the first of the PE network elements and the second of the PE network elements;
   defining a second trunk to follow the second path through the network and extending between one of the NNI interfaces on the first of the PE network elements and one of the NNI interfaces on the second of the PE network elements.

3. The method of claim 2, further comprising the step of:
   associating the first trunk with the second trunk to form a trunk group.

4. The method of claim 3, further comprising the step of:
   designating the first and second trunks as primary and secondary trunks within the trunk group, such that upon detection of a failure on the path associated with the first trunk, the service instances and service groups mapped to the first trunk may be protection switched to the path associated with the second trunk.

5. The method of claim 4, wherein detection of the failure on the path associated with the first trunk is performed via the Trunk OAM.

* * * * *

UNITED STATES PATENT AND TRADEMARK OFFICE
CERTIFICATE OF CORRECTION

| | | |
|---|---|---|
| PATENT NO. | : 7,936,680 B2 | Page 1 of 1 |
| APPLICATION NO. | : 11/297822 | |
| DATED | : May 3, 2011 | |
| INVENTOR(S) | : John Osswald | |

It is certified that error appears in the above-identified patent and that said Letters Patent is hereby corrected as shown below:

In Column 8, line 44, Claim 2, replace "elements" with --element--.

Signed and Sealed this
Twentieth Day of September, 2011

David J. Kappos
*Director of the United States Patent and Trademark Office*